United States Patent [19]

Halbohm

[11] Patent Number: 5,331,243
[45] Date of Patent: Jul. 19, 1994

[54] METHOD FOR LIFTING A GENERATOR ROTOR SHAFT TO FACILITATE SHAFT BREAKAWAY AND MAINTENANCE

[75] Inventor: John Halbohm, Esperance, N.Y.

[73] Assignee: General Electric Company, Schenectady, N.Y.

[21] Appl. No.: 988,698

[22] Filed: Dec. 10, 1992

[51] Int. Cl.⁵ ............................................. H02K 5/00
[52] U.S. Cl. .................................... 310/91; 29/596; 29/732; 29/426.5
[58] Field of Search ............ 29/596, 598, 732, 402.03, 29/402.08, 426.5; 310/91, 42; 414/433

[56] References Cited

U.S. PATENT DOCUMENTS

| | | | |
|---|---|---|---|
| 2,701,648 | 2/1955 | McBath | 214/1 |
| 2,825,477 | 3/1958 | Ross | 214/152 |
| 2,894,450 | 7/1959 | Steinitz | 101/124 |
| 2,920,773 | 1/1960 | Knabe | 214/1 |
| 3,480,158 | 11/1969 | Pandjiris et al. | 214/1 |
| 4,062,456 | 12/1977 | Birdwell | 214/1 |
| 4,177,682 | 12/1979 | Blackman | 74/128 |
| 4,310,281 | 1/1982 | Egashira | 414/433 |
| 4,451,979 | 6/1984 | Schuster | 29/824 |
| 4,452,558 | 6/1984 | Muraguchi | 414/433 |
| 4,519,279 | 5/1985 | Ruggeri | 82/38 |
| 4,526,503 | 7/1985 | Muraguchi | 414/433 |
| 4,541,603 | 9/1985 | Hayashi | 310/91 X |
| 4,567,649 | 2/1986 | Ades et al. | 29/800 |
| 4,586,864 | 5/1986 | Muraguchi et al. | 414/433 |
| 4,590,653 | 5/1986 | Ades et al. | 29/156 |

*Primary Examiner*—Carl E. Hall
*Attorney, Agent, or Firm*—Nixon & Vanderhye

[57] ABSTRACT

The method of lifting a generator rotor shaft (12) off its bearing (10) to enable breakaway during start-up and for maintenance purposes includes providing a hydraulic cylinder (22) with a pair of rollers (28) mounted on the cylinder piston (32) engageable with the shaft (12). At start-up, the cylinder is actuated to elevate the shaft a maximum distance of about 0.005 inches to enable a film of lubricating oil to flow between the shaft journal and the bearing pads. For maintenance purposes, and after removal of the upper bearings, the shaft can be elevated by actuation of the jack a distance sufficient to enable removal of the lower bearings from the pedestal.

3 Claims, 2 Drawing Sheets

METHOD FOR LIFTING A GENERATOR ROTOR SHAFT TO FACILITATE SHAFT BREAKAWAY AND MAINTENANCE

TECHNICAL FIELD

The present invention relates to a method for lifting a generator rotor shaft relative to its lower bearing to allow rotor shaft breakaway during start-up and to facilitate maintenance of the roller bearing and shaft.

BACKGROUND

When a rotor shaft mounted in bearings has not been rotated for a period of time, the oil film between the rotor shaft journal and the lower bearing surfaces becomes extremely thin or nonexistent. Metal-to-metal contact between the shaft journal and the lower bearing surfaces sometimes occurs in view of the weight of the rotor shaft, e.g., on the order of 20 or more tons, on the lower bearing surfaces. The reduced oil film or metal-to-metal contact between the rotor shaft journal and the lower bearing surfaces results in an inability to rotate the rotor shaft at start-up in the absence of a very high breakaway torque applied to the shaft. Apart from the undesirability of a high breakaway torque, it causes problems in routine maintenance of the shaft and bearings. For example, the lower bearings cannot be removed because of the weight of the shaft resting on those bearings. Additionally, even if the shaft is jacked up, most jacking-type devices do not permit the shaft to rotate for maintenance purposes while elevated off the lower bearing surfaces.

These problems, to some extent, have previously been recognized. Systems exist to facilitate initial rotation and start-up of a generator rotor shaft. For example, hydrostatic systems employing high-pressure oil feeding through the lower bearing surfaces have been used to essentially raise the shaft journal from the bearing sufficiently to permit the formation of an oil film between those surfaces, whereby the rotor shaft can be readily rotated with minimum starting torque. Such hydrostatic systems, however, involve complicated bearing structure, including the necessity to route high-pressure oil through passages and orifices in the bearings and bearing surfaces. Furthermore, such high-pressure oil systems cannot be used in routine maintenance, particularly, when the upper bearing surfaces have been removed. Thus, this added expense and complexity does not cure both start-up and maintenance problems. Other types of devices for lifting the rotor from the bearing such as jacks or wooden cribbing have also been used. Use of these, however, is oftentimes awkward and dangerous.

DISCLOSE OF INVENTION

According to the present invention, there is provided a roller jacking fixture which is independent of the rotor shaft bearings for lifting the rotor shaft sufficiently at start-up to enable the formation of an oil film between the shaft journal and the bearing surfaces, thereby breaking any metal-to-metal shaft journal and bearing surfaces contact and reducing and minimizing the start-up torque. Additionally, the roller-jacking fixture of the present invention may be used for maintenance purposes to lift the rotor shaft to a clearance above the lower bearing surfaces to enable the lower bearings to be removed for inspection and maintenance, as well as permitting the rotor shaft to be rotated while elevated to enable maintenance of the shaft journal and ancillary parts. To accomplish this, there is provided a roller assembly including a pair of rollers mounted on roller bearings and which rollers are supported by a hydraulic cylinder for vertical movement. The roller assembly is located along the rotor shaft at a position axially spaced from the shaft journal and bearing surfaces. At start-up, with the upper and lower bearing surfaces in place as in normal operation, the rollers are engaged against the shaft and the shaft is elevated by actuation of the hydraulic cylinder of the jacking fixture.

At start-up, the hydraulic cylinder is preferably manually operated to provide a clearance or gap between the shaft journal and the lower bearing surfaces sufficient only to permit an oil film to be developed in the gap. This clearance may be on the order of about 0.005 inch. Once the oil film is developed and a start signal is applied to rotate the generator rotor shaft, the rollers may be moved out of contact with the generator roller shaft, i.e., retracted from the shaft, with the shaft being thus supported on the oil film as in normal operation. Consequently, the break-away torque for the generator rotor shaft is minimized when the shaft is elevated as described.

For maintenance purposes, the roller jack fixture may comprise a permanent part of the generator housing. Thus, the hydraulic jacking fixture may be fixed to the generator housing at a location normally spacing the rollers from the shaft, but in position to engage and lift the shaft. For maintenance purposes, the hydraulic jack has an extension sufficient to elevate the shaft from the lower bearing surfaces and enable the lower bearing surfaces to be removed from the bearing pedestal. When the shaft is elevated, the rollers also permit the shaft to be rotated while maintenance is being performed.

In accordance with a preferred embodiment of the present invention, there is provided a method of facilitating start-up of a rotor shaft having a journal resting on a lower bearing surface of a bearing having upper and lower bearing surfaces encompassing said shaft bearing journal, comprising the steps of, with the upper and lower bearing surfaces encompassing the shaft journal, engaging a pair of rollers carried by a lifting jack with and below the shaft at a location spaced axially along the shaft from the bearing, and lifting the rotor shaft from the lower bearing surface by actuating the lifting jack to space the shaft bearing journal and the lower bearing surface relative to one another.

In accordance with a further preferred embodiment of the present invention, there is provided a method of facilitating maintenance of a rotor shaft for a generator, the rotor shaft having a journal resting on a lower bearing surface of a bearing having upper and lower bearing surfaces encompassing the shaft bearing journal, comprising the steps of removing the upper bearing surfaces, engaging a pair of rollers carried by a lifting jack with and below the shaft at a location spaced axially along the shaft from the bearing, lifting the rotor shaft from the lower bearing surface by actuating the lifting jack to space the shaft bearing journal and the lower bearing surface relative to one another, and removing the lower bearing surface.

Accordingly, it is a primary object of the present invention to provide a method for facilitating start-up of a generator rotor shaft in a manner which minimizes the breakaway torque at start-up, and also enables the shaft

BEST MODE FOR CARRYING OUT THE INVENTION

Reference will now be made in detail to a present preferred embodiment of the invention, an example of which is illustrated in the accompanying drawings.

Figure 1:
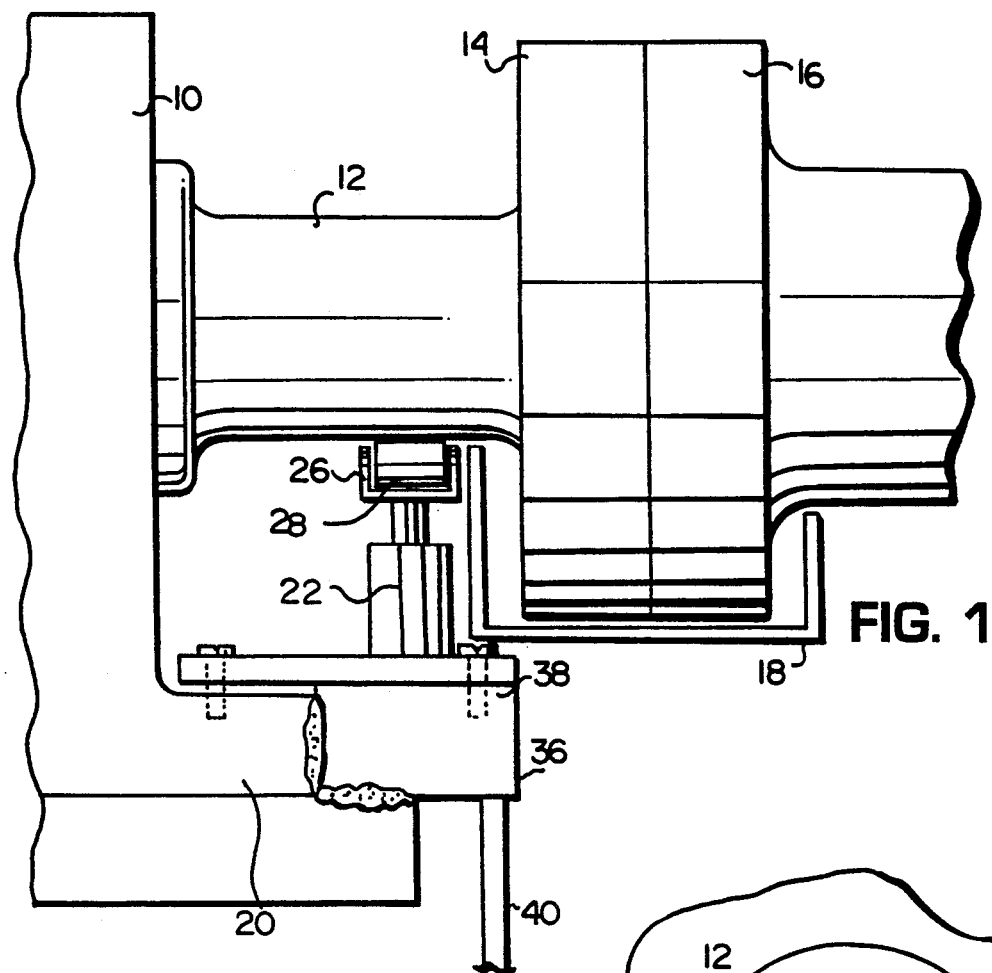
FIG. 1 is a fragmentary side elevational view illustrating portions of a bearing pedestal for a rotor shaft and a roller-jacking fixture constructed in accordance with the present invention.

Referring to FIG. 1, there is illustrated a bearing pedestal 10 for rotatably supporting a shaft 12, i.e., a generator rotor shaft. The end of shaft 12, includes a shaft coupling 14 for connection with a load coupling 16, the details of which are well known in this art. The couplings 14 and 16 are at least in part surrounded by a coupling guard cover 18. Pedestal 10 also includes a pedestal base 20 which is elevated from a support or ground level, not shown.

Figure 2:
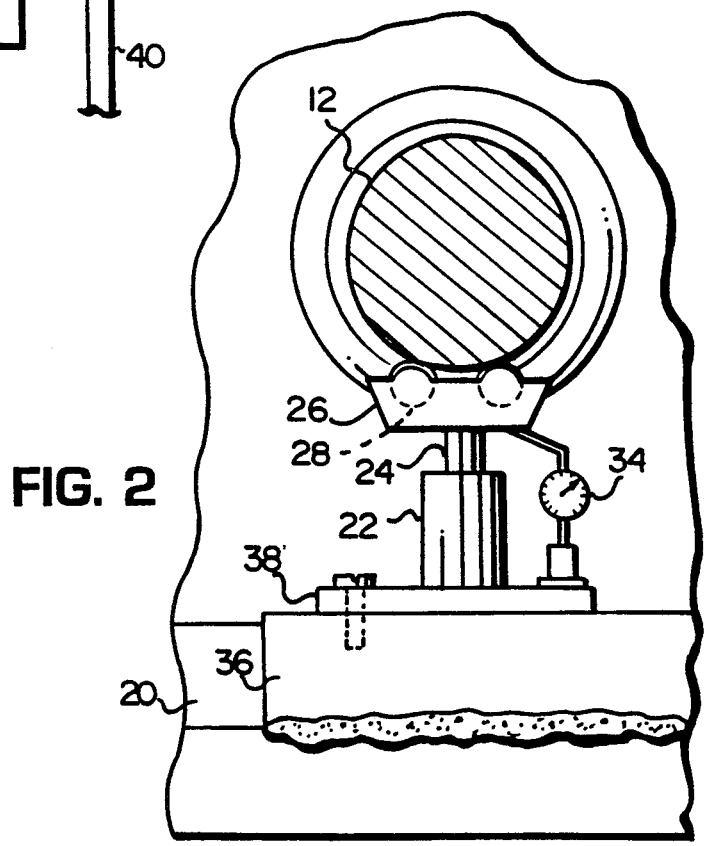
FIG. 2 is a cross-sectional view through the shaft illustrating in elevation the roller-jacking fixture of the present invention.

The roller-jacking fixture as illustrated in FIGS. 1 and 2, includes a cylinder 22, preferably a hydraulic cylinder, the piston shaft 24 of which carries a fork 26 mounting a pair of laterally spaced rollers 28. It will be appreciated that rollers 28 are mounted for rotation about axes parallel to the axis of rotation of shaft 12. The roller-jacking fixture is also mounted such that rollers 28 lie on opposite sides of a vertical plane extending through the axis of the shaft. The fork 26 comprises a welded steel fabricated cradle for the rollers 28. The rollers 28 are preferably formed of brass, i.e., formed of a much softer material than the material forming shaft 12. Rollers 28 are, of course, mounted on roller bearings carried by the cradle or fork 26.

Figure 3:
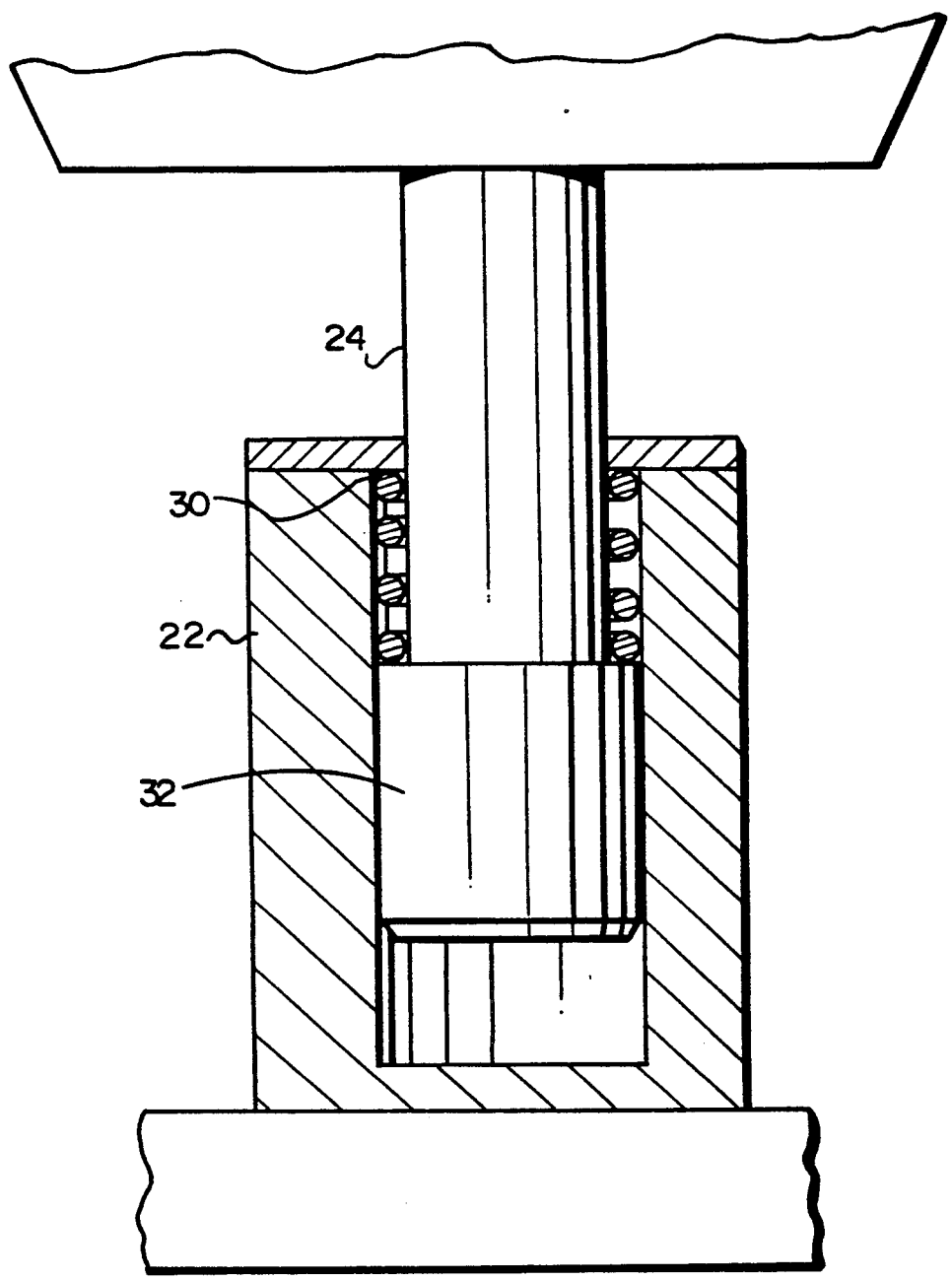
FIG. 3 is a an enlarged fragmentary cross-sectional view of the roller jacking fixture.

Hydraulic jack 22 is preferably of the spring-loaded return type. Thus, when the hydraulic pressure is released, a spring 30 will displace the rollers 28 in a direction away from the shaft 12. Consequently, as illustrated in FIG. 3, spring 30 biases the piston 32 and piston shaft 24 for movement away from shaft 12.

As illustrated particularly in FIG. 2, a measuring device is carried by the fixture to measure the relative movement between the pedestal base and the bottom of the shaft surface 12 when the roller-jacking fixture is employed. Indicator 34 may, for example, be a magnetic base dial indicator. Hydraulic cylinder 22 is preferably hand operated using a quick disconnect hose line, not shown, connected to the cylinder. To support the roller-jacking fixture, there is provided a support block 36 and a fixture base plate 38. Block 36 and plate 38 are designed for either permanent welding in place or bolting to the pedestal base 20. Thus, the fixture is designed so that it can be left in position once installed. Alternatively, at those sites with multiple generator units, the fixture is designed so that it may be portable, i.e., the yoke containing the rollers, the hydraulic jack and the base plate 38 can be removed as a package and relocated to other units as required.

To properly locate the roller-jacking fixture below shaft 12, a fixture-support plate 38 has a pair of slots at its forward end and a pair of holes at its rear end. A support block 36 is suitably secured, for example, by welding to the pedestal base. Initially, screws are inserted through the slotted holes in plate 38 and into tapped holes in the support block to loosely secure the plate 38 and the roller-jacking fixture to support block 36. A support 40 is secured to the underside of the support block 36. By moving the support plate 38, the rollers can be centered so that both rollers will contact the shaft surface simultaneously. When the roller-jacking fixture is properly aligned, openings are tapped in the pedestal base and screws are applied to secure the pedestal plate 38 to the base 20.

When using the roller-jacking fixture it will be recalled that the hydraulic cylinder 22 is designed to lift the generator rotor shaft 20 off its bearing to enable break-away of the rotor shaft during generator start-up. This permits bearing lubricating oil to flow under the shaft journal to enable the rotor to rotate. At start-up, the hydraulic cylinder 22 is operated to raise the rollers 26 so that they in turn engage the shaft and raise it a distance sufficient only to permit the formation of an oil film necessary for start-up i.e., a maximum distance of about 0.005 inches. This permits the oil to flow between the shaft journal and the bearing surfaces. After initial shaft rotation is detected, rollers 28 are lowered away from the shaft 12 leaving the journal of shaft 12 in contact with the oil film between it and the bearing surfaces.

It is convenient to permanently mount the roller-jacking fixture to the generator pedestal because the jacking fixture is also useful for routine maintenance and further affords a safety feature. For example, the upper bearings in the pedestal housing can readily be removed for routine maintenance and inspection with the rotor shaft resting on the lower bearings. However, to remove the lower bearings, the shaft must be elevated sufficiently to permit circumferential movement of the lower bearings relative to the pedestal. Consequently the range of movement of the piston of the hydraulic cylinder 22 is sufficient, for example on the order 4–5 inches, to lift the rotor shaft a distance to enable removal of the lower bearing pads from the bearing pedestal. Additionally, when the shaft is mounted on rollers 28 and elevated, shaft 12 may be rotated on rollers 28 for inspection and maintenance.

As a safety feature, the jacking fixture can be lowered after start-up a distance to space the rollers 28 from shaft 12 but at a distance insufficient to permit the shaft journal to rest on the lower bearing surfaces without an oil film therebetween. That is, the rollers 28 can be positioned at an elevation such that the shaft engages the rollers, for example, at shutdown, without the shaft squeezing out the oil from between the shaft journal and the lower bearing surfaces.

It will be appreciated that the roller-jacking fixture hereof may be applied to one end, opposite ends or intermediate portions of a rotor shaft as necessary or desirable.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A method of facilitating rotational start-up of a non-rotating rotor shaft having a journal resting on a lower bearing surface of a bearing having upper and lower bearing surfaces encompassing said shaft bearing journal, comprising the steps of:

with the upper and lower bearing surfaces encompassing said shaft journal, engaging a pair of rollers carried by a lifting jack with and below the shaft at a location spaced axially along the shaft from said bearing; and lifting the non-rotating rotor shaft from the lower bearing surface by actuating the lifting jack to space the shaft bearing journal and the lower bearing surface relative to one another, the step of lifting including spacing the shaft journal from the lower bearing surface a distance sufficient to enable formation of a lubricant film between the shaft journal and the lower bearing surface to permit rotation of said shaft in said bearing;

rotating the shaft while maintaining the rollers engaged with the shaft and the shaft journal spaced said distance from the lower bearing surface; and removing said rollers from contact with said shaft.

2. A method of facilitating start-up of a rotor shaft having a journal resting on a lower bearing surface of a bearing having upper and lower bearing surfaces encompassing said shaft bearing journal, comprising the steps of:

with the upper and lower bearing surfaces encompassing said shaft journal, engaging a pair of rollers carried by a lifting jack with and below the shaft at a location spaced axially along the shaft from said bearing;

lifting the rotor shaft from the lower bearing surface by actuating the lifting jack to space the shaft bearing journal and the lower bearing surface relative to one another, the step of lifting including spacing the shaft journal from the lower bearing surface a distance only sufficient to enable formation of a lubricant film between the shaft journal and the lower bearing surface to permit rotation of said shaft in said bearing.

3. A method of facilitating start-up of a rotor shaft having a journal resting on a lower bearing surface of a bearing having upper and lower bearing surfaces encompassing said shaft bearing journal, comprising the steps of:

with the upper and lower bearing surfaces encompassing said shaft journal, engaging a pair of rollers carried by a lifting jack with and below the shaft at a location spaced axially along the shaft from said bearing;

lifting the rotor shaft from the lower bearing surface by actuating the lifting jack to space the shaft bearing journal and the lower bearing surface relative to one another, including spacing the shaft journal from the lower bearing surface a distance no greater than about 0.005 inches.

* * * * *